Jan. 30, 1940.  C. H. BRADFIELD  2,188,827
SAW MACHINE BASE
Filed May 24, 1938  2 Sheets-Sheet 1

Inventor
Chas H. Bradfield
By Clarence A. O'Brien
and Hyman Berman
Attorneys

Jan. 30, 1940.　　C. H. BRADFIELD　　2,188,827
SAW MACHINE BASE
Filed May 24, 1938　　2 Sheets-Sheet 2
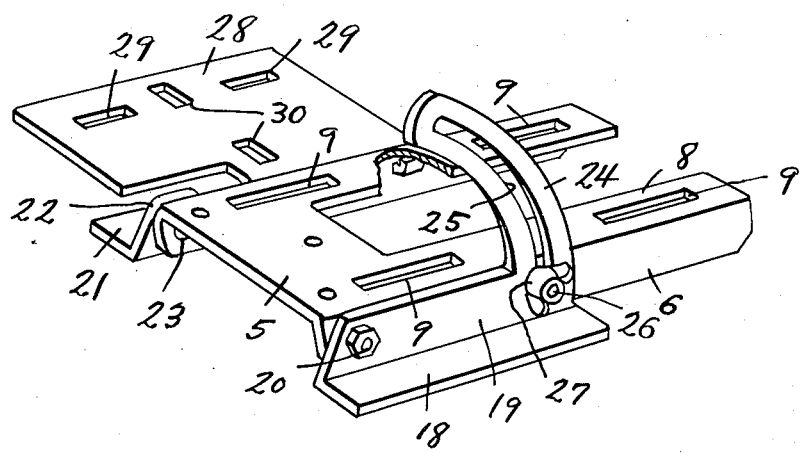
Fig. 3.
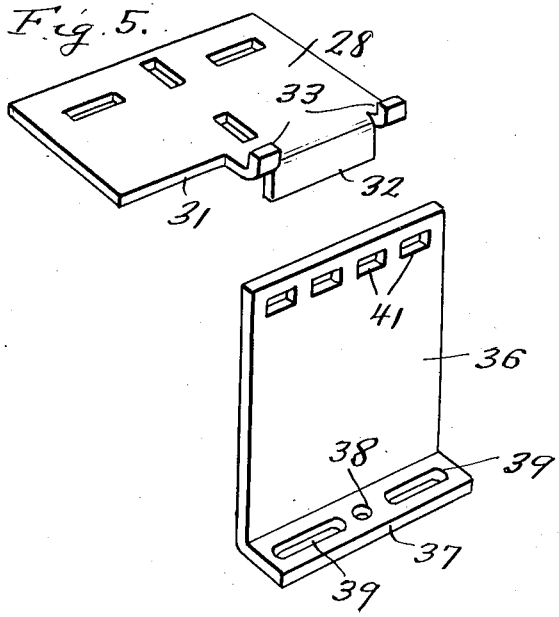
Fig. 5.
Fig. 6.
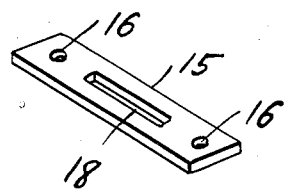
Fig. 4.
Inventor
Chas H. Bradfield
By Clarence A O'Brien
and Hyman Berman
Attorneys Patented Jan. 30, 1940

2,188,827

UNITED STATES PATENT OFFICE 2,188,827

SAW MACHINE BASE

Charles H. Bradfield, Springfield, Mo.

Application May 24, 1938, Serial No. 209,772

3 Claims. (Cl. 248—23)

This invention relates to a base for a saw machine, such as a bench power saw machine, band saw machine, or jigsaw machine, and has as its object the provision of a base so equipped as to be readily swung vertically to the desired position of angular adjustment relative to the horizontal to the end that the work-supporting table of the machine and through which the saw passes, may be at all times disposed substantially on a horizontal plane regardless of the oblique position in which the saw may be set for cutting bevels at a desired angle.

Figure 1:
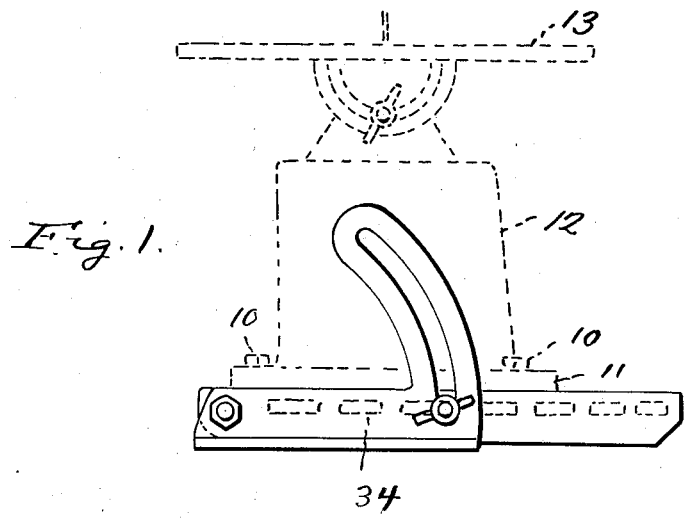
Figure 2:
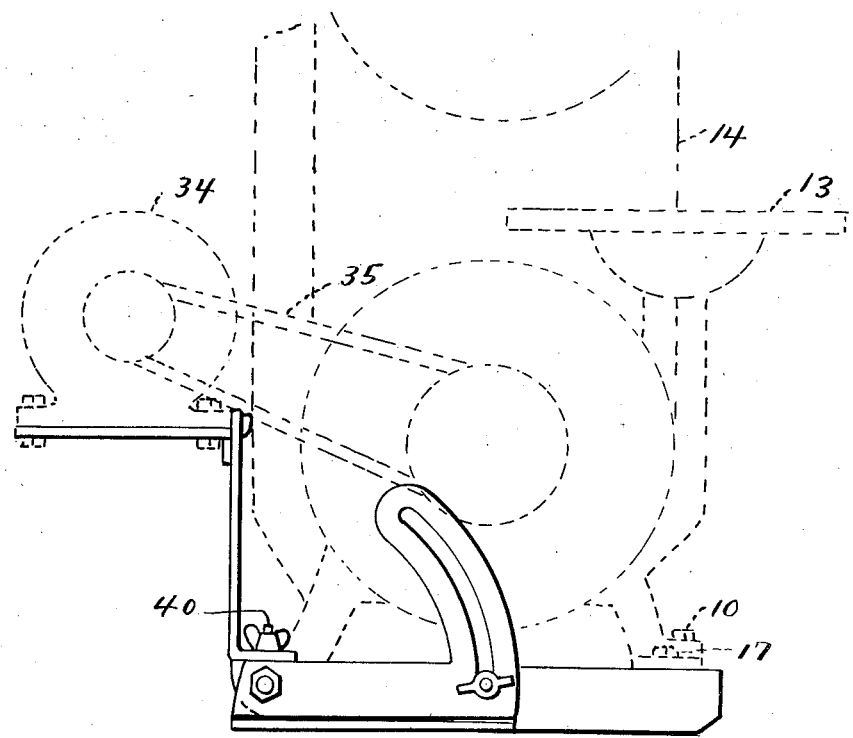

The invention together with its objects and advantages will be best understood from a study of the following description taken in connection with the accompanying drawings wherein:

Figure 1 is a side elevational view illustrating the application of the invention to a bench power saw or jigsaw, Figure 2 is a view similar to Figure 1 but illustrating the application of the invention to a power band saw, Figure 3 is a perspective view of the tiltable base provided for application to a bench or jigsaw, Figure 4 is a cross plate hereinafter more fully referred to, Figure 5 is a perspective view of a motor-supporting plate, and Figure 6 is a perspective view of a supporting bracket for the plate shown in Figure 5.

Referring to the drawings in detail it will be seen that in both embodiments of the invention the improved stand or tilting base comprises a platform 5 having at opposite longitudinal side edges thereof depending flanges 6 and 7.

In the present instance the platform 5 is provided with an elongated U-shaped notch 8 to reduce the weight thereof and at opposite sides of the notch is provided with slots 9 to accommodate bolts or other fastening elements 10 for securing thereto as shown in Figure 1 the base 11 of the work-supporting table stand 12 of a saw machine, the tiltable table mounted on the stand 12 being indicated by the reference numeral 13; or as shown in Figure 2, for securing to the platform 5 the supporting legs of a band saw machine shown fragmentarily by broken lines in Figure 2 and indicated generally by the reference numeral 14.

In connection with the above where the platform 5 has mounted thereon a band saw machine as shown in Figure 2 there is used in connection with the base 5 to bridge the slot 8 a cross plate 15 that is provided at its opposite ends with openings 16 to accommodate bolts or other fastening elements 17 through the medium of which and the slots 9 the cross plate 15 is secured at the desired position of adjustment on the platform 5. The plate 15 as shown is also provided with an elongated slot 18 for accommodating one of the attaching bolts 10 used in securing the supporting legs of the saw machine 14 to the platform 5.

For supporting the platform 5 so that it may be swung vertically to the desired position of angular adjustment relative to the horizontal there is provided for one side of the platform 5 a foot plate 18 that has an upstanding flange 19 to which is pivoted as at 20 the flange 6 of the platform 5 at one end of the platform. At the other side of the platform 5 there is disposed a relatively shorter supporting foot 21 that has an upstanding flange 22 to which flange 7 of the platform 5 is pivoted as at 23.

It will thus be seen that with the supporting feet 21 and 18 resting flatly on the ground, platform 5 may be swung on the pivot 20, 23 vertically to the desired position of angular adjustment.

For securing the platform 5 at the desired position of angular adjustment the flange 19 of foot 18 has rising therefrom an arcuate arm 24 provided with a slot 25 which accommodates a threaded stud 26 that projects laterally from the flange 6 and is equipped with a wing nut 27. Obviously, when wing nut 27 is threaded home into binding engagement with the arm 24 platform 5 will be secured at the desired position of adjustment.

When the platform 5 is used in conjunction with the work-supporting table stand 12 mounted thereon there is used in connection with the platform 5 a motor-supporting shelf or plate 28 which is provided with suitably arranged pairs of slots 29 and 30 accommodating bolts or other fastening elements through the medium of which an electric motor for driving the power saw is secured on the plate or shelf 28.

The plate or shelf 28 adjacent one corner thereof is notched as at 31 to accommodate the supporting foot 21 and at the notched edge thereof plate or shelf 28 is provided with a depending lip 32 adapted to bear against the flange 7, and at opposite ends of the lip 32 with upwardly directed hook-like lugs 33 adapted to be engaged with selected slots 34 arranged in series on the flange 7 to the end that the plate 28 is detachably mounted on the platform 5 to extend laterally thereof and at the desired position of adjustment longitudinally of the platform.

When the platform 5 is used for supporting thereon a band saw machine, such as the band saw machine 14 shown in Figure 2, plate 28 is also used for supporting the electric motor 34 that is equipped for driving the band saw through the medium of a belt and pulley drive connection 35 as is conventional and as shown in Figure 2. However, under such conditions the plate 28 is supported above the plane of the platform 5 and at one end of the platform through the medium of a supporting bracket 36.

Bracket 36 is in the form of a substantially rectangular plate provided at one end with a base flange 37 having therein an opening 38 and slots 39 to accommodate bolts or other suitable fastening elements 40 through the medium of which the supporting bracket 36 is detachably mounted on one end of the platform 5.

Adjacent the upper edge thereof the supporting bracket 36 is provided with a series of slots 41 to accommodate the hooks 33 of the plate 28 in a manner clearly shown in Figure 2 whereby the plate 28 is detachably secured to the upper end of the bracket 36 for supporting the motor 34 at the desired elevation.

It will be apparent that in accordance with the present invention, the work-supporting table 13 of the saw machine, whether it be a saw machine assembly of the type shown in Figure 1, or the type shown in Figure 2, is first tilted to the desired angle of elevation after which the platform 5 is tilted to the desired angle of inclination and to such an angle of inclination as to dispose the table 13 substantially in a horizontal plane regardless of the angle of inclination of the saw machine as determined by the angle of inclination of the platform 5.

It will thus be seen that I have provided a tiltable base for power driven saw machines whereby the saw machine may be bodily tilted to the desired angle of inclination or position of obliqueness to the end that regardless of the angle of inclination of the machine the work-supporting table through which the saw passes will be disposed substantially in a horizontal plane, and this, without detracting from the utility of the saw in cutting bevels of any desired angle.

It is thought that a clear understanding of the construction, utility, advantages and operation of the invention will be had without a more detailed description.

Having thus described the invention what is claimed as new is:

1. A supporting base for a power-driven saw machine, said base comprising a pair of opposed supporting legs, a platform pivoted at one end thereof between and to said legs and adapted to have a power-driven saw machine mounted directly thereon, one of said supporting legs having an arcuate fixed arm rising therefrom and provided with a slot, and said platform at one side thereof having a threaded stud projecting laterally therefrom and working in the slot of said arm, and a nut threaded on said stud to bind against said arm for securing the platform and the saw machine thereon at the desired angle of inclination, together with a supporting plate for the power unit of the saw machine and interengaging means on said plate and said base for detachably securing the plate on the base to extend laterally from one edge of said platform.

2. A supporting base for a power-driven saw machine, said base comprising a pair of opposed stationary legs, a saw supporting means, said means being pivotally connected at one end thereof between and to said legs and adapted to have a power-driven saw machine mounted directly thereon, means for securing the pivoted saw support and the saw machine thereon at the desired angle of inclination, together with a supporting plate for the power unit of the saw machine and interengaging means on said plate and said base for detachably securing the plate on the base to extend laterally from one edge of said saw support.

3. A supporting base for a power-driven saw machine or the like, said base comprising a pair of opposed stationary legs, a saw supporting frame, said frame being pivoted at one end thereof to said legs and adapted to have a power driven saw machine or the like mounted directly thereon, adjustable means cooperating with said saw supporting frame and one of said stationary legs for securing the frame and the saw machine thereon at the desired angle of inclination, together with a supporting plate for the power unit of the saw machine or the like extending laterally from one edge of said supporting frame.

CHARLES H. BRADFIELD.